Patented Jan. 17, 1950

2,494,678

UNITED STATES PATENT OFFICE 2,494,678

PROCESS OF SEPARATING PROGESTERONE FROM CHOLESTEROL

Léon Velluz and Geneviève Rousseau, Paris, France, assignors to Les Laboratoires Francais de Chimiotherapie, Paris, France, a French company No Drawing. Application October 29, 1946, Serial No. 706,510. In France November 15, 1945

1 Claim. (Cl. 260—397.3)

In the commercial preparation of progesterone from cholesterol, as well as in the manufacture of other valuable steroid derivatives, a separation as complete as possible of the pure hormone from the reacting media is highly desirable. However, conventional crystallization processes always lead, after separating the crystallized components, to complex mixtures of ketosteroids from which the pure product can no longer be extracted.

It can be guessed that selective precipitation of certain hydrazones would assist in the desired separation. But the literature did not confirm as yet this hypothesis in the case of progesterone, as the hydrazides heretofore described, such as semi-carbazide, which combine with progesterone in the form of an insoluble compound, also precipitate the other ketosteroids.

The invention is based on the discovery that progesterone can be quantitatively and selectively precipitated when this diketon is caused to react upon the lutidine-2,6-dicarbonic-3,5-dihydrazide

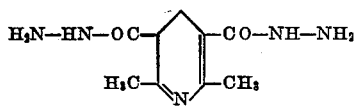

Said dihydrazide which may be prepared by the process described by Mohr (Beilstein, t. XXII, p. 163—Mohr. Ber. d. Deutsch. Chem. Ges. 33, 1115), possesses the property of yielding with progesterone a practically alcohol-insoluble compound.

The combination of pure progesterone with said dihydrazide takes place in equimolecular proportion. The yield exceeds 95%. Progesterone can be regenerated therefrom by means of benzaldehyde, according to a known practice, whereas acidic hydrolysis causes a loss of the product.

In certain cases, the process above described may be associated with further processes, for example as described in the specification of French Patent No. 907,312, filed Oct. 14, 1944, and entitled: "Process of separating Δ-4,5-androstene-dione-3,17."

The specification above referred to states that another hydrazide of the pyridic series, viz nicotic hydrazide, can be used for separating Δ-4,5-androstenedione-3,17. As said hydrazide does not produce any precipitation with progesterone, the combined use of both nicotic hydrazide and the dihydrazide above referred to thus permits separating both ketosteroids from complex mixtures in a satisfactory manner.

Further developments are possible in the case of ketosteroids containing progesterone and which can already be purified by known processes.

*Example 1.*—1 part progesterone in 25 vol. methanol are refluxed in the presence of 1,2 vol. acetic acid and 1,2 part of the dihydrazide above referred to. After 1 hour's boiling, the mixture is cooled down, iced, and water is drawn off. The yield is the theoretical one.

The hydrazone obtained is decomposed by means of benzaldehyde in the conditions usually adopted for ketosteroid semicarbazones.

The final yield is 72% of the progesterone present in the initial mixture.

Having now described our invention what we claim as new and desire to secure by Letters Patent is:

A process of separating progesterone from mixtures of ketosteroids, which comprises condensing progesterone with lutidine-2,6-dicarbonic-3,5-dihydrazide, separating the insoluble hydrazone thus obtained, and regenerating progesterone by decomposition by means of benzaldehyde.

LÉON VELLUZ.
GENEVIÈVE ROUSSEAU.

REFERENCES CITED

The following references are of record in the file of this patent:

UNITED STATES PATENTS

| Number    | Name            | Date           |
|-----------|-----------------|----------------|
| 2,153,700 | Serini et al.   | Apr. 11, 1939  |
| 2,172,590 | Miescher et al. | Sept. 12, 1939 |
| 2,319,012 | Miescher et al. | May 11, 1943   |
| 2,319,013 | Miescher et al. | May 11, 1943   |